June 13, 1933.   L. G. COPEMAN   1,913,747
METHOD OF MOLD CONSTRUCTION FOR REPRODUCING PATTERNS IN RUBBER
Filed July 27, 1929   2 Sheets-Sheet 1

INVENTOR.
Lloyd G. Copeman.
BY
Stuart C. Barnes
ATTORNEY.

June 13, 1933.  L. G. COPEMAN  1,913,747
METHOD OF MOLD CONSTRUCTION FOR REPRODUCING PATTERNS IN RUBBER
Filed July 27, 1929  2 Sheets-Sheet 2

INVENTOR.
Lloyd G. Copeman
BY Stuart C. Barnes
ATTORNEY.

Patented June 13, 1933

1,913,747

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

METHOD OF MOLD CONSTRUCTION FOR REPRODUCING PATTERNS IN RUBBER

Application filed July 27, 1929. Serial No. 381,467.

This invention relates to a mold construction for reproducing patterns in rubber, and has to do particularly with a novel method of forming and building up a mold for reproducing intricate patterns having irregular surface contours.

The present invention relates to molds for forming rubber articles, of the type described in my prior application No. 374,993, filed July 1, 1929, wherein the surface of the original pattern is reproduced by molding by means of a plastic material allowed to set, in contrast to fabricating the mold from a solid integral article. Molds for reproducing articles in rubber, of the types described in said application, and formed of stone, have proved practical and very satisfactory, but some difficulty has been experienced in molding certain types of rubber which have required relatively high vulcanizing temperatures, in that the stone molds have shown a tendency to deteriorate under continued use at such relatively high temperatures.

It is the object of the present invention to provide a mold which is formed by directly applying the material of the mold to the original pattern to obtain the reproduction of the same, much the same as described in said application but which will withstand the highest vulcanizing temperatures required in all kinds and grades of rubber.

More specifically, the present invention contemplates the use of a plastic material to reproduce the contour of the pattern, but this plastic material which forms the actual working surface of the mold depression is formed of a metal coating, applied in a plastic state and allowed to harden. I preferably use stone in obtaining the original depression from the pattern, although the depression of the original pattern may be formed in the metal coating in various different manners.

The mold of the present invention is particularly designed for reproducing very delicate objects, such as lace, in rubber, wherein the particular difficulty resides in the very small parts and the recessed portions which give trouble in drawing the same.

It will be obvious that the mold may be built up in various different ways, and in the figures I have diagrammatically illustrated a preferred way wherein the original pattern 1 may be positioned on a suitable slab 2. This pattern may be positioned on this slab in any suitable manner such as by tacking on linen, by gluing, or any other suitable manner. The slab may be positioned within a suitable mold frame 3 which is diagrammatically shown as being of one piece but which preferably would be divided in a line coinciding with the line of the slab, on which the pattern 1 rests.

I next preferably cover the pattern with plaster of Paris which may be initially applied very carefully by means of a brush or otherwise, so as to carefully exclude all air pockets and completely cover and surround all small projections of the pattern.

Figure 1:
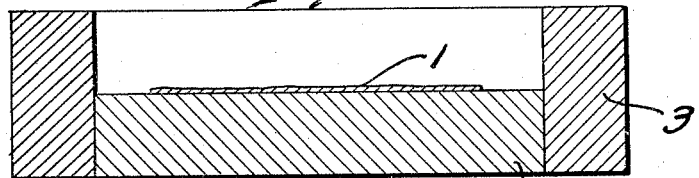
Fig. 1 is a diagrammatic view of the first step in my preferred method of forming a mold according to the present invention.
Figure 2:
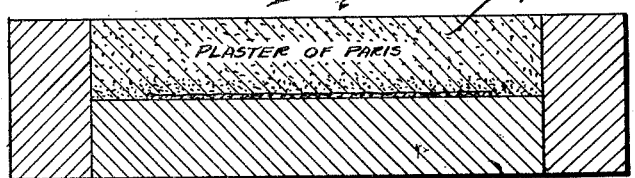
Fig. 2 illustrates the second step of applying a layer of plaster of Paris to cover the original pattern and allowing the same to harden whereby to reproduce the surface contour of the pattern.
Figure 3:
Fig. 3 illustrates the third step of positioning refrigerant conducting means in the space above the plaster of Paris mold.
Figure 4:
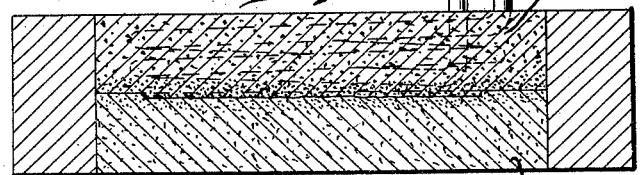
Fig. 4 illustrates the next step of surrounding the cooling parts with oxy-chloride cement.

This plaster of Paris mold, which may be designated 4, with its reproducing depression 5, may be then positioned as shown in Fig. 3, to receive oxy-chloride cement which may consist of approximately one-third magnesium oxide, one-third silex (silica) and one-third barium sulphate, by weight, to which is added sufficient magnesium chloride to make the mix suitable for pouring.

This plastic mix is then carefully applied to the upper wall of the plaster of Paris mold in a manner to exclude all bubbles, and then gradually built up so as to surround the cooling coils 6. These coils 6 may be connected to any suitable refrigerating medium for a purpose to be later described. This stone mold 7 is then allowed to set and the plaster of Paris mold may then be removed therefrom either by forcibly tearing the same away or by dissolving the same with any suitable medium. The plaster of Paris being very frangible, it will readily tear away from the oxy-chloride stone mold, leaving parts of the plaster of Paris embedded in parts of the oxy-chloride cement mold, with the result that these parts may be very readily removed by the use of compressed air or scraping or any other suitable medium.

The working surface of the stone male mold is preferably very dense and smooth so as to present a practically non-porous surface. This stone block 7 formed of oxy-chloride cement may then be used as a unit or encased within a suitable frame 3, as best shown diagrammatically in Fig. 5, and a suitable metal mold block 8 placed on top thereof. I preferably spray the upper surface of this stone mold 7 with a coating of metal by what is known as the Shoupe process.

This layer of metal is sprayed on evenly in the standard manner, and at the same time a refrigerating medium is passed through the coils 6 to maintain the block 7 at a lowered temperature. This layer of metal 9 may be built up to any thickness desired and the oxy-chloride stone block 7 removed in much the same manner as the plaster of Paris block was removed from the oxy-chloride cement block.

This layer of metal 9 may be backed by oxy-chloride cement or any other filling in accordance with the design of the vulcanizing machine. The kind of metal used in spraying the stone mold in building up the reproducing mold is immaterial in the present case as long as said metal when set will withstand the highest temperatures encountered in the vulcanizing step. I have found that german silver will be a good metal to use in this process, but it will be obvious that any other metal having a wide range of melting point may be used.

Figure 5:
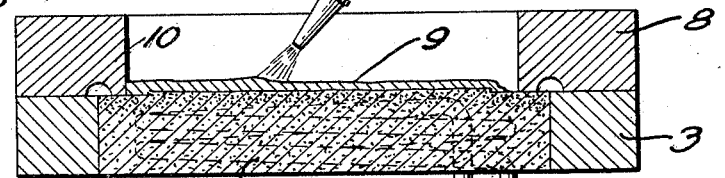
Fig. 5 illustrates the step of applying the metal coating to the surface of the male stone mold.
Figure 6:
Fig. 6 is a diagrammatic view of one form of finished reproducing mold.
Figure 7:
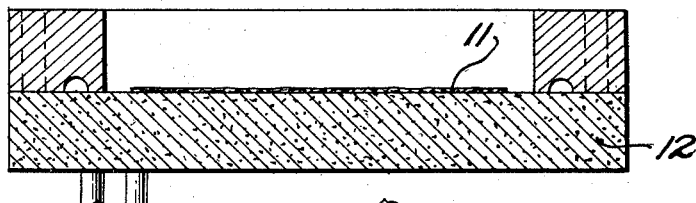
Fig. 7 is a sectional diagrammatic view of another method of forming a cast mold with a metal reproducing surface wherein the article to be reproduced is positioned on a cooled slab.
Figure 8:
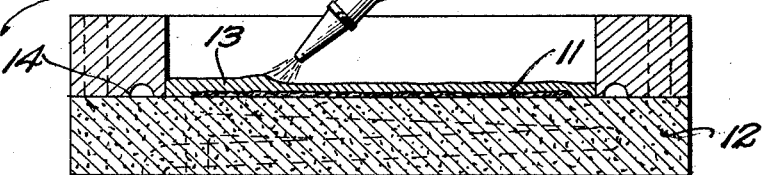
Fig. 8 is a view similar to Fig. 7 showing the cooling means in dotted lines and showing the method of applying the plastic metal directly to the surface of the pattern.

In Fig. 5 I have shown the flash ring as at 10, but it will be understood that such flash ring might be formed directly in the built up metal wall 9 by forming the necessary raised portions in the stone mold 7. In Fig. 6 I have diagrammatically shown a completed mold half of metal. The particular form of the mold is not important in the present case, but the main point is the forming of a plastically applied molding material similar to stone and having a higher melting point, and the secondary point is the utilization of the stone as one of the steps in the forming of the present mold.

In some cases the use of plaster of Paris and oxy-chloride cement blocks as steps in the process may be eliminated and in place thereof the original pattern may be directly sprayed by the metal coating process and the mold built up therefrom. In this case the article or pattern 11 is directly glued or otherwise secured to a slab which is preferably a cooled stone slab 12.

The purpose of cooling the slab in this case is the same as that in the building up of the mold shown in Fig. 5, and that is to prevent curling up of the outer layers of metal after the same has been sprayed over the depression to be reproduced. In other words, I have found that if attempts are made to directly spray over a stone surface that is relatively smooth, but not cooled, that after the stone is removed there is a tendency for the outer layer or layers of the built up metal mold to curl up or peel off.

The pattern having been secured to the cooled block 12, the metal may be directly sprayed thereon as at 13 until the mold block is built up. In this case the separate flash rings 14 may be formed in the outer part of the mold block or such flash rings may be formed in the built up metal 13 by the provision of a suitable annular raised portion on the stone slab.

Figure 9:
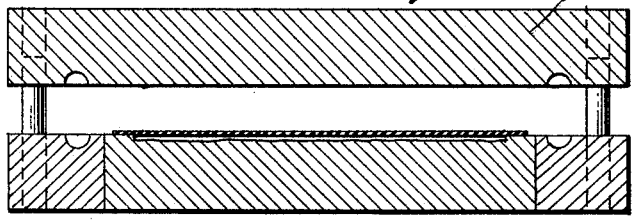
Fig. 9 illustrates diagrammatically the method of forming the rubber article.
Figure 10:
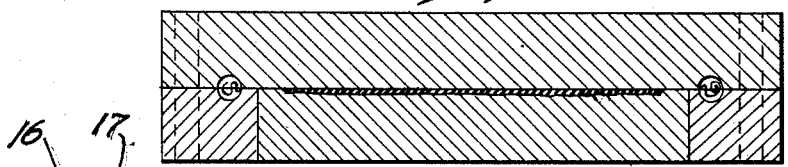
Fig. 10 illustrates the step of forcing the rubber into the mold depression preparatory to vulcanizing the same.
Figure 11:
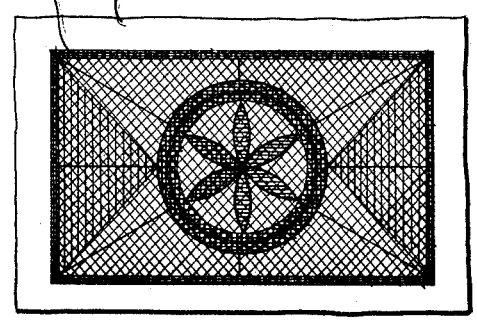
Fig. 11 is a plan view of a rubber article after removal from the mold.

Figs. 9 and 10 are diagrammatic of a mold block built up according to either process and illustrating one manner of forming the rubber article, one half of the mold block being formed by the sprayed or built up metal and the other half 15 being formed of a plain surface metal block. The raw rubber in the desired form is placed between a mold and then forced into the mold depression and vulcanized. An article formed by the molds illustrated is shown as at 16 wherein 17 represents the flash portion of the article which is trimmed off.

What I claim is:

1. The method of forming molds for reproducing articles in rubber, which comprises obtaining an impression of a surface of original non-molded article by plastically applying stone to said surface, allowing the same to harden, removing the article to leave the impression in the stone, applying a layer of stone to the surface of the already formed stone block containing the impression, said second stone being of a greater hardness than said first stone, allowing the same to harden, and removing the first stone block to leave an impression in said second stone block, and then building up a mold half by applying molten metal to the surface of said second stone half containing said impression.

2. The method of forming molds for reproducing articles in rubber, which comprises obtaining an impression of the article in plaster of Paris, applying stone formed from oxy-chloride cement to the surface of said plaster of Paris containing said impression, removing said plaster of Paris to leave the impression in said stone, and then plastically applying a layer of metal to the impression in said stone and building up said layer of metal to form a mold half, cooling said stone mold during the applying of said metal, and then removing the stone block to leave a permanent impression in said metal mold.

3. The method of forming molds for reproducing articles in rubber, which comprises forming an impression of the article in plaster of Paris, applying stone formed from oxy-chloride cement to the surface of said plaster of Paris containing said impression, removing said plaster of Paris to leave the impression in said stone, and then plastically applying a layer of metal to the impression in said stone and building up said layer of metal to form a mold half, and then removing the stone block to leave a permanent impression in said metal mold.

4. The method of forming molds for reproducing articles in rubber, which comprises forming an impression of the article in stone, cooling said stone, applying a layer of molten metal to the surface of said stone and allowing the same to set, and then removing said stone block after the same has set whereby to leave a permanent impression of the article in the metal.

5. The method of forming molds for reproducing articles in rubber, which comprises forming a female impression of the article in plaster of Paris, applying a layer of plastic stone to the plaster of Paris, said stone having greater density and greater strength than said plaster of Paris, and allowing the same to set, removing the plaster of Paris to leave a raised impression simulating the original pattern, plastically applying a layer of metal to said raised impression and building up said layer to form a mold half and then removing said stone to leave a permanent impression in said plastically applied stone.

6. The method of forming molds for reproducing articles in rubber, which comprises plastically applying metal to the surface of the article to be reproduced, allowing the same to set, absorbing heat from the article during the applying and setting steps, and then removing the material forming said surface whereby to leave a permanent depression in the metal mold.

7. The method of forming molds for reproducing articles having irregular surface contours in rubber, which comprises cooling the article, depositing a layer of metal on the surface of the article to be reproduced, and then removing the portion of the article coated by said metal whereby to leave a permanent depression in said applied metal.

In testimony whereof I affix my signature.
LLOYD G. COPEMAN.